United States Patent
Emett

[19]

[11] Patent Number: 5,473,835
[45] Date of Patent: Dec. 12, 1995

[54] JIGGING APPARATUS

[76] Inventor: Alton M. Emett, 700 Evans Ave., Butte, Mont. 59701

[21] Appl. No.: 271,786

[22] Filed: Jul. 7, 1994

[51] Int. Cl.$^6$ ................................................ A01K 97/10
[52] U.S. Cl. ........................................ 43/19.2; 43/26.1
[58] Field of Search ........................ 43/21.2, 19.2, 43/26.1

[56] References Cited

U.S. PATENT DOCUMENTS

| | | | |
|---|---|---|---|
| 2,707,843 | 5/1955 | Howe | 43/26.1 |
| 3,550,302 | 12/1970 | Creviston | 43/19.2 |
| 3,568,352 | 3/1971 | Hill | 43/19.2 |
| 4,680,885 | 7/1987 | Lindelt | 43/19.2 |
| 4,763,435 | 8/1988 | Deering | 43/21.2 |
| 4,951,411 | 8/1990 | Ecker | 43/19.2 |
| 5,036,616 | 8/1991 | Wilsey | 43/19.2 |
| 5,056,255 | 10/1991 | Campbell . | |
| 5,084,995 | 2/1992 | Beaudoin . | |

*Primary Examiner*—Kurt Rowan
*Attorney, Agent, or Firm*—Richard C. Litman

[57] ABSTRACT

A jigging apparatus structured to support a fishing rod and for use in mechanically reciprocating a fishing line basically includes a base and an oscillating assembly supported by the base. The base is configured to receive the handle of a fishing rod and hold the fishing rod in an upright, angularly disposed position. A storage compartment is located in the base and a cap is removably attachable to the base, for access to the storage compartment. The oscillating assembly supports a spool which is capable of engaging fishing line, displacing the fishing line and thereby, effecting a reciprocation of a fishing lure attached to the fishing line. The spool is rotated in a vertical plane and is connected to a prime mover by a variable length, radially extending arm; this provides selective variation in the degree of reciprocation of the fishing line, and thus the lure.

13 Claims, 2 Drawing Sheets

JIGGING APPARATUS

BACKGROUND OF THE INVENTION

1. Field of the Invention

The present invention relates to a jigging apparatus and more particularly, to an apparatus for mechanically effecting reciprocation of a fishing line.

2. Description of the Prior Art

According to the present invention, a convenient and effective apparatus for supporting a fishing rod and for jigging a fishing line is provided. Jigging a fishing line effects reciprocation of the fishing line for the purpose of attracting a fish. Jigging may be accomplished by raising and lowering the fishing rod or by tugging and releasing the fishing line. As the line is oscillated, a lure attached to the fishing line gravitates up and down in the water until a fish strike occurs.

It is desirable to provide a jigging device that eliminates the need for manually jigging the fishing line. Various types of fishing apparatuses have been provided in the prior art for accommodating various fishing conditions. For example, U.S. Pat. No. 5,084,995, issued Feb. 4, 1992 to Arthur W. Beaudoin, discloses a jigging apparatus comprising a stand for holding a fishing rod. A drive motor effects reciprocation of the end of the fishing rod.

Another jigging apparatus is described in U.S. Pat. No. 5,056,225, issued Oct. 15, 1991 to Richard A. Campbell. This apparatus includes a rod holder and a drive motor for imparting motion to the rod holder.

None of the above inventions and patents, taken either singly or in combination, is seen to describe the instant invention as claimed.

SUMMARY OF THE INVENTION

The present invention relates to a jigging apparatus structured to support a fishing rod and for use in mechanically reciprocating a fishing line. The apparatus includes a base and an oscillating assembly supported by the base.

The base includes a U-shaped tubular member and an angularly offset tubular member adjoining the U-shaped member. The U-shaped tubular member defines a hollow chamber. Caps engaging the U-shape tubular member are removable to offer access to the hollow chamber. The hollow chamber functions as a compartment for storing sundry items. The angularly disposed element includes an open upper end which is configured to receive the handle of a fishing rod to hold the fishing rod in an upright, angularly disposed position.

The apparatus also includes an elevated platform and a battery holder located proximate a forward end of the U-shaped member. The platform provides support for the oscillating assembly. The oscillating assembly includes a prime mover and a radially extending arm driven by the prime mover. The radially extending arm includes a first end, a second end, and a connecting rod connecting the first end to the second end. The first end is attached to the drive shaft of the prime mover. The second end supports a spool which engages a fishing line.

With a fishing rod supported by the angularly offset member of the base, the spool is disposed in a plane defined between the fishing rod and the fishing line. As the prime mover is driven, the drive shaft of the prime mover rotates the radially extending arm in a plane defined between the fishing rod and the fishing line. Upon rotation of the radially extending arm, the spool engages the fishing line for at least a portion of the rotation, displacing the fishing line and thereby effecting a reciprocation of a fishing lure attached to the fishing line.

The spool preferably has a substantially smooth, curved take up surface configured to resist entanglement with the fishing line.

The prime mover with the radially extending arm and spool are supported on an inverted, L-shaped element, which is arranged to permit a complete, non-interference rotation of the radially extending arm. To vary the displacement of the fishing line, the length of the radially extending arm may be varied by varying the length of the connecting rod. Various length connecting rods may be stored in the base and accessible through the removal of the cap.

Accordingly, it is a principal object of the invention to provide a jigging apparatus structured to support a fishing rod and for use in mechanically reciprocating a fishing line.

It is another object that the base define a storage compartment and include a cap which is removable to render access to the storage compartment.

It is a further object that the base include a holder configured to receive the handle of a fishing rod and hold the fishing rod in an upright, angularly disposed position.

Yet another object is that apparatus include an the oscillating assembly for displacing a fishing line and thereby, effecting reciprocation of a fishing lure.

Still another object is that the apparatus resist entanglement with the fishing line.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
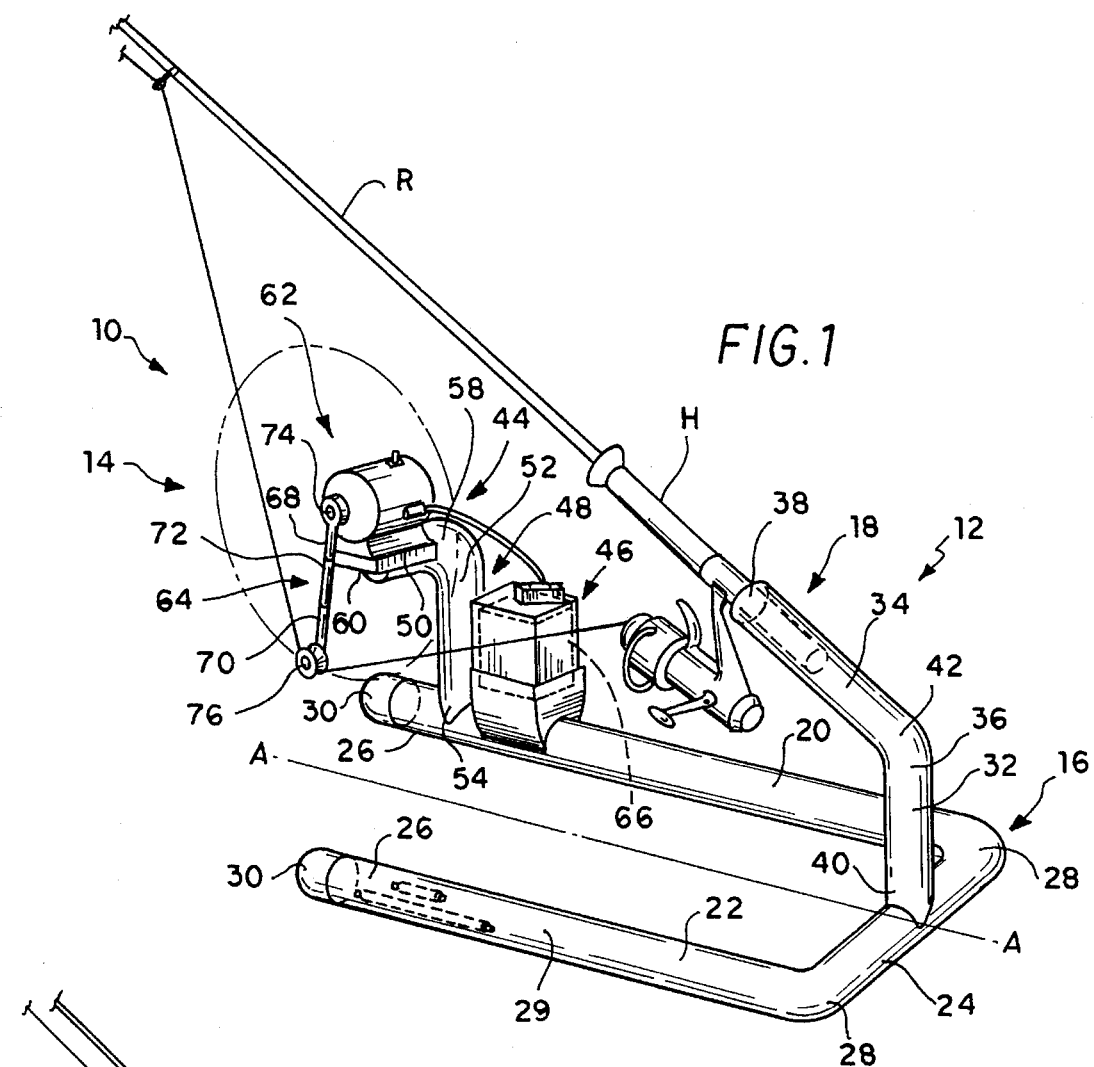
FIG. 1 is an environmental rear perspective view of a jigging apparatus according to the present invention.
Figure 2:
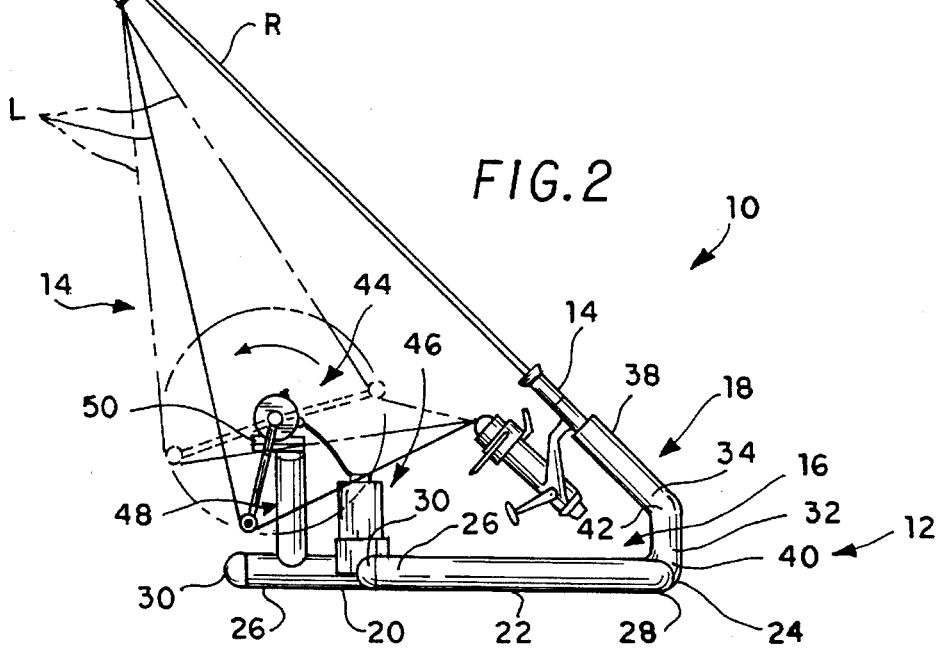
FIG. 2 is an environmental elevational view of the apparatus shown in FIG. 1.

The present invention, as shown in FIGS. 1 and 2, is a jigging apparatus 10 structured to support a fishing rod R and for use in mechanically reciprocating a fishing line L. The apparatus 10 includes a base 12 and an oscillating assembly 14 supported by the base 12.

The base 12 includes a first or U-shaped tubular member 16 and a second or angularly offset tubular member 18 adjoining the first tubular member 16. The U-shaped tubular member 16 includes a pair of longitudinal or side elements 20, 22 arranged parallel to one another, and a lateral or rear element 24 arranged perpendicular to the side elements 20, 22. The side elements 20, 22 each have a forward or first end 26 and a rear or second end 28 opposite the forward end 26. Likewise, the rear element 24 has oppositely disposed, first and second ends. The first and second ends of the rear element 24 are common to respective rear ends 28 of the side elements 20, 22, forming the U-shaped tubular member 16.

The U-shaped tubular member 16 defines a hollow chamber 29. Removable caps 30 engage the forward ends 26 of the side elements 20, 22 of the U-shape tubular member 16. Removal of the caps 30 offers access to the hollow chamber 29. The hollow chamber 29 functions as a compartment for storing sundry items.

The offset tubular member 18 includes a vertical element 32 and an angularly disposed element 34. The vertical and angularly disposed elements 32, 34 each have an upper end 36, 38 and a lower end 40, 42. The lower end 40 of the vertical element 32 is adjoined to the rear element 24 of the U-shaped member 16. The vertical element 32 extends upwardly from the rear element 24 from a central point located equidistantly from both ends of the rear element 24. The lower end 42 of the angularly disposed element 34 is integral with the upper end 36 of the vertical element 32 and is oriented so as to extend forwardly of the rear element 24. The upper end 38 of the angularly disposed element 34 is open to receive the handle H of the fishing rod R to hold the fishing rod R in an upright, angularly disposed position.

It should be noted that the U-shaped tubular member 16 is dimensioned and configured to provide sufficient support for both the angularly offset member 18 and the fishing rod R extending from the angularly offset member 18.

The apparatus 10 further includes an elevated platform 44 and a battery holder 46 located proximate the forward end 26 of at least one of the side elements 20 of the U-shaped tubular member 16. The elevated platform 44 includes a vertically disposed inverted L-shaped element 48 and a horizontally disposed planar element 50 supported by the inverted L-shaped element 48. The large leg 52 of the L-shaped element 48 has a first or lower end 54 and a second or upper end 56. The small leg 58 of the L-shaped element 48 includes a first end common with the upper end 56 of the large leg 52 of the L-shaped element 48 and a second end 60 opposite the first end. The large leg 52 extends vertically from the side element 20 of the U-shaped member 16 and the small leg 58 extends laterally toward a central axis A—A defined by the base 12. The planar element 50 is adjoined to the smaller leg 58 and provides support for the oscillating assembly 14.

The oscillating assembly 14 includes a prime mover 62, such as the electric motor shown, and a radially extending arm 64 driven by the prime mover 62. Although the prime mover 62 shown is operable via a power cell or battery 66, as is shown in the drawings, the prime mover may be a mechanically drive motor, i.e. a spring driven motor (not shown). As is clearly shown in FIG. 4, the radially extending arm 64 includes a first end 68, a second end 70, and a connecting rod 72 connecting the first end 68 to the second end 70. The first end 68 is attached to the drive shaft 74 of the prime mover 62. The second end 70 supports a spool 76 which is capable of carrying or engaging fishing line L.

With the fishing rod R supported by the angularly offset member 18 of the base 12, the spool 76 is disposed in a plane defined between the fishing rod R and the fishing line L. As the prime mover 62 is driven, the drive shaft 74 of the prime mover 62 rotates the radially extending arm 64 in the plane defined between the fishing rod R and the fishing line L. As shown in FIG. 2, upon rotation of the radially extending arm 64, the spool 76 engages or carries the fishing line L for at least a portion of the rotation thereof, displacing or oscillating the fishing line L, and thereby effecting a reciprocation of the fishing lure (not shown).

Figure 3:
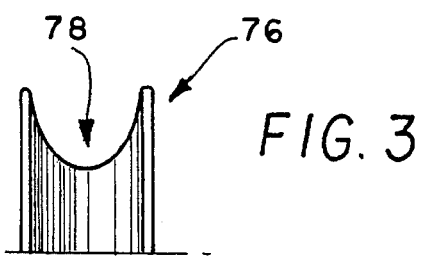
FIG. 3 is a partial section view of a spool.

The spool 76, as shown in FIG. 3, has a substantially smooth, curved or concave take up surface 78 configured to resist entangling the fishing line L.

It should be noted that the large leg 52 of the inverted L-Shaped element 48 should be dimensioned and configured appropriately to permit a complete, non-interference rotation of the radially extending arm 64.

Figure 4:
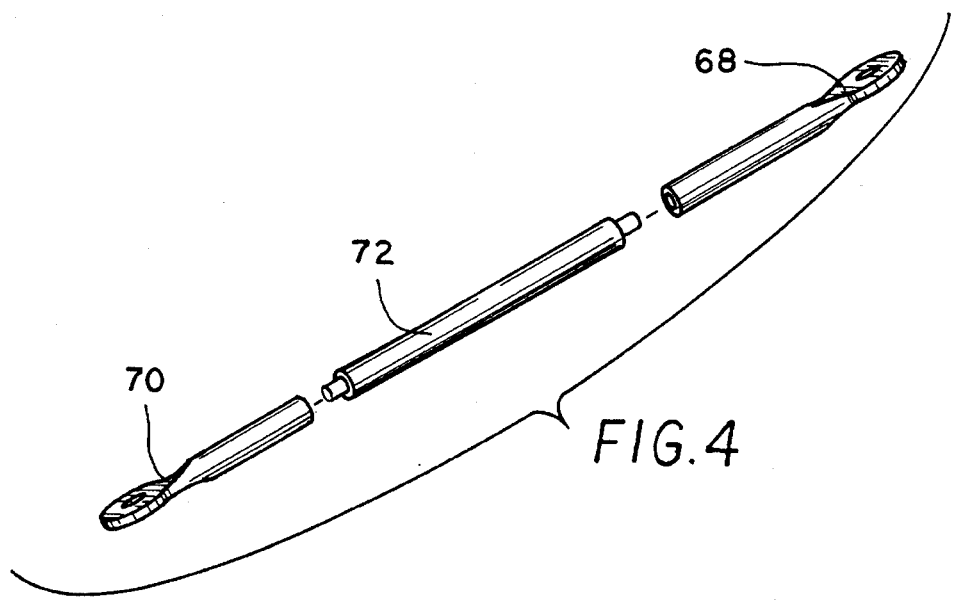
FIG. 4 is an exploded perspective view of an arm.
Figure 5:
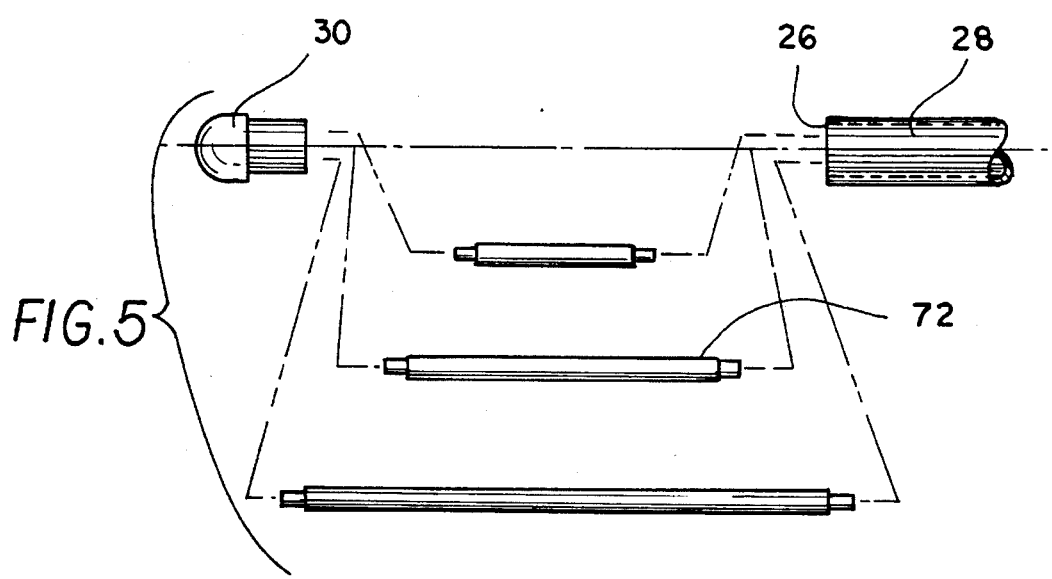
FIG. 5 is a exploded partial elevational view of a base and arm segments of varying length.

To vary the displacement of the fishing line L, the length of the radially extending arm 64 may be varied by varying the length of the connecting rod 72. As shown in FIG. 4, the ends 68, 70 of the extension arm 64 are separable from the connecting rod 72. Various length connecting rods may be stored in the base 12 and are accessed through the removal of the cap 30, as is shown in FIG. 5.

It is to be understood that the present invention is not limited to the sole embodiment described above, but encompasses any and all embodiments within the scope of the following claims.

I claim:

1. A jigging apparatus for supporting a fishing rod and effecting reciprocation of a fishing line, said apparatus comprising:
   a base including,
      a U-shaped member having a pair of side elements and a rear element connecting said side elements,
      a fishing rod holder attached to said rear element, and
      an elevated platform attached to one of said side elements; and
   an oscillating assembly supported by said elevated platform, said oscillating assembly being configured to engage and axially reciprocate the fishing line.

2. The apparatus according to claim 1, wherein said elevated platform includes a vertically disposed inverted L-shaped element and a planar element supported by said inverted L-shaped element.

3. The apparatus according to claim 1, wherein said fishing rod holder includes a fishing rod supporting, angularly offset member.

4. The apparatus according to claim 1, wherein said fishing rod holder includes at least an angularly offset member, said offset member extending upwardly and substantially parallel with said side elements, holding the fishing rod in an upright angularly disposed position, substantially parallel to said side elements.

5. The apparatus according to claim 1, wherein said base U-shaped member defines a hollow chamber and includes at least a removable cap, said cap being removable to provide access to said hollow chamber.

6. The apparatus according to claim 1, wherein said oscillating assembly includes a prime mover and a radially extending arm responsive to said prime mover.

7. The apparatus according to claim 6, wherein said oscillating assembly is elevated sufficiently to enable complete rotation of said radially extending arm.

8. The apparatus according to claim 6, wherein said radially extending arm includes a first end connected to said prime mover, a second end connected to said first end, and a spool supported by said second end, said spool being disposed in a plane defined by the fishing rod and the fishing line, said radially extending arm being responsive to said prime mover to rotate said radially extending arm in the plane defined by the fishing rod and the fishing line, thereby placing said spool into engagement with the fishing line, and axially reciprocating the fishing line.

9. The apparatus according to claim 8, further including at least one connecting rod connecting said first end to said second end.

10. The apparatus according to claim 8 wherein said radially extending arm further includes a plurality of interchangeable connecting rods of various lengths, whereby one of said connecting rods is selected to interconnect said radially extending arm first and second ends, thus providing for user selection of length of said radially extending arm.

11. The apparatus according to claim 8, wherein said spool includes a substantially smoothly curved take up surface configured to resist entanglement with the fishing line.

12. The apparatus according to claim 6, wherein said oscillating assembly includes at least an electric motor.

13. The apparatus according to claim 12, said jigging apparatus further including battery means for powering said electric motor, and a holder for said battery, said holder being located proximate said electric motor.

\* \* \* \* \*